(12) United States Patent
Tan

(10) Patent No.: US 10,697,328 B2
(45) Date of Patent: Jun. 30, 2020

(54) DEVICE AND METHOD FOR REMOVING PARTICLES FROM AIR FLOW

(71) Applicant: General Electric Company, Schenectady, NY (US)

(72) Inventor: Chiong Siew Tan, Norwich, NY (US)

(73) Assignee: General Electric Company, Schenectady, NY (US)

(*) Notice: Subject to any disclaimer, the term of this patent is extended or adjusted under 35 U.S.C. 154(b) by 121 days.

(21) Appl. No.: 15/703,099

(22) Filed: Sep. 13, 2017

(65) Prior Publication Data

US 2019/0078472 A1 Mar. 14, 2019

(51) Int. Cl.
| | |
|---|---|
| *B01D 45/12* | (2006.01) |
| *F01D 25/32* | (2006.01) |
| *B01D 45/08* | (2006.01) |
| *B01D 45/16* | (2006.01) |
| *F02C 7/052* | (2006.01) |
| *B04C 3/00* | (2006.01) |
| *B04C 3/06* | (2006.01) |

(52) U.S. Cl.
CPC .............. *F01D 25/32* (2013.01); *B01D 45/08* (2013.01); *B01D 45/16* (2013.01); *B04C 3/06* (2013.01); *B04C 2003/006* (2013.01); *F02C 7/052* (2013.01); *F05D 2220/30* (2013.01); *F05D 2260/607* (2013.01)

(58) Field of Classification Search
CPC ......... F01D 25/32; B01D 45/08; B01D 45/16; F05D 2220/30; F05D 2260/607; F02C 7/052; B04C 2003/006; B04C 3/06
See application file for complete search history.

(56) References Cited

U.S. PATENT DOCUMENTS

| 2,731,102 A | | 1/1956 | James | |
|---|---|---|---|---|
| 3,360,908 A | * | 1/1968 | Baily | B01D 45/12 55/347 |
| 3,392,712 A | * | 7/1968 | Lustenader | F01K 7/42 122/459 |
| 3,478,494 A | * | 11/1969 | Van Luik, Jr. | B03C 3/15 210/243 |
| 3,529,724 A | | 9/1970 | Maciula et al. | |
| 3,706,383 A | * | 12/1972 | Palma | B01D 45/16 209/434 |
| 3,915,679 A | * | 10/1975 | Roach | B04C 3/04 55/347 |

(Continued)

FOREIGN PATENT DOCUMENTS

| CN | 101528102 | 9/2009 |
|---|---|---|
| KR | 20010068553 | 7/2001 |
| WO | 2009026611 | 3/2009 |

*Primary Examiner* — Dung H Bui
(74) *Attorney, Agent, or Firm* — McGarry Bair PC

(57) ABSTRACT

A separator for separating at least a part of particles from an air flow flowing inside a conduit comprises at least one separating unit. Each separating unit comprises: a protrusion, extending inwardly from an inner surface of the conduit and configured to direct at least a part of the particles towards a wall of the conduit. The separating unit further comprises a hole throughout a thickness of the wall, positioned downstream of and adjacent to the protrusion, and configured to pass the particles moving towards the wall to an outer side of the conduit.

14 Claims, 9 Drawing Sheets

(56) References Cited

U.S. PATENT DOCUMENTS

| | | | | |
|---|---|---|---|---|
| 3,951,813 | A * | 4/1976 | Palma | B01D 43/00 210/374 |
| 4,057,482 | A * | 11/1977 | Candor | B01D 21/0009 204/643 |
| 4,149,836 | A | 4/1979 | Price | |
| 4,289,611 | A | 9/1981 | Brockmann | |
| 4,349,360 | A * | 9/1982 | Schuurmans | B01D 47/06 261/79.2 |
| 4,591,367 | A * | 5/1986 | Pek | B01D 45/12 55/344 |
| 4,806,288 | A * | 2/1989 | Nowosinski | B01J 19/30 261/94 |
| 4,859,067 | A * | 8/1989 | Hoppe | B01F 5/243 366/341 |
| 6,110,294 | A | 8/2000 | Shipley et al. | |
| 6,508,052 | B1 | 1/2003 | Snyder et al. | |
| 7,258,727 | B2 * | 8/2007 | Greif | B01D 45/16 55/396 |
| 7,581,397 | B2 | 9/2009 | Strangman et al. | |
| 7,835,483 | B2 * | 11/2010 | Chaki | B01D 45/16 376/370 |
| 7,879,123 | B2 | 2/2011 | Lundquist et al. | |
| 8,043,413 | B2 | 10/2011 | Chillar et al. | |
| 8,663,350 | B2 | 3/2014 | Snyder et al. | |
| 9,347,355 | B2 * | 5/2016 | Floyd | F01N 3/2066 |
| 2002/0144931 | A1 * | 10/2002 | Sechrist | B04C 3/04 208/113 |
| 2005/0060970 | A1 * | 3/2005 | Polderman | B01D 45/08 55/320 |
| 2008/0110140 | A1 * | 5/2008 | Egger | B01D 45/08 55/337 |
| 2010/0307738 | A1 | 12/2010 | Mouget et al. | |
| 2011/0048696 | A1 * | 3/2011 | Holte | B01D 19/0057 166/105.5 |
| 2011/0067409 | A1 | 3/2011 | Beeck | |
| 2012/0168361 | A1 * | 7/2012 | Motakef | B01D 46/0046 210/137 |
| 2013/0152522 | A1 * | 6/2013 | Stippich | B01D 45/16 55/398 |
| 2014/0318088 | A1 * | 10/2014 | Bizzarro | B04C 5/06 55/450 |
| 2015/0040537 | A1 * | 2/2015 | Hicks | F01N 3/2066 60/273 |
| 2015/0345331 | A1 | 12/2015 | Murray et al. | |
| 2016/0096136 | A1 | 4/2016 | Su et al. | |
| 2016/0265435 | A1 | 9/2016 | Snyder | |
| 2017/0101896 | A1 | 4/2017 | Manning et al. | |
| 2017/0122202 | A1 | 5/2017 | Rahaim et al. | |

* cited by examiner

DEVICE AND METHOD FOR REMOVING PARTICLES FROM AIR FLOW

BACKGROUND

Embodiments of the present disclosure relate generally to separators and methods for separating at least a part of particles from an air flow, and more particularly to devices and methods for removing at least a part of particles from an air flow in a turbine engine.

Turbine engines, and particularly gas or combustion turbine engines, are rotary engines that extract energy from a flow of combusted gases passing through the engine onto a multitude of turbine blades. Turbine engines for aircraft are designed to operate at high temperatures to maximize engine thrust, so cooling of certain engine components, such as the high-pressure turbine and the low-pressure turbine, may be necessary. Typically, cooling is accomplished by ducting cooling air from the high and/or low pressure compressors to the engine components which require cooling.

Particles, such as dirt, dust, sand, and other environmental contaminants, in the cooling air can accumulate inside cooling passages and degrade the thermal barrier coating. For example, particles supplied to the turbine blades can clog, obstruct, or coat the flow passages and surfaces of the blades, which can reduce the lifespan of the turbine.

Single-stage cyclone separators are often used to remove and collect the particles, where the collection efficiency depends on angular momentum, particle size and cyclone design. The need for higher collection efficiency requires greater angular momentum at the expense of higher pressure loss.

Therefore, it is desirable to provide new devices and methods for removing particles from an air flow to solve at least one of the above-mentioned problems.

BRIEF DESCRIPTION

In one aspect, a separator for separating at least a part of particles from an air flow flowing inside a conduit comprises at least one separating unit. Each separating unit comprises a protrusion, extending inwardly from an inner surface of the conduit and configured to direct at least a part of the particles towards a wall of the conduit. The separating unit also comprises a hole throughout a thickness of the wall, positioned downstream of and adjacent to the protrusion and configured to pass the particles moving towards the wall to an outer side of the conduit.

In another aspect, a device for removing at least a part of particles from an air flow in a turbine engine comprises a decelerator, configured to decelerate the air flow to a velocity where an inertial force of the air flow is smaller than a viscous force of the air flow. The device also comprises at least one tube, each comprising an inner peripheral wall fluidly coupled with the decelerator for passing the decelerated air flow inside the inner peripheral wall. The device also comprises at least one separator inside the at least one tube respectively, each configured to separate at least a part of particles from the decelerated air flow inside the corresponding tube. The separator comprises at least one separating unit. Each separating unit comprises a protrusion, which extending inwardly from an inner surface of the inner peripheral wall and configured to direct at least a part of the particles towards the inner peripheral wall. Each separating unit also comprises a hole throughout a thickness of the inner peripheral wall, positioned downstream of and adjacent to the protrusion, and configured to pass the particles moving towards the inner peripheral wall to an outer side of the inner peripheral wall.

In yet another aspect, a method for separating at least a part of particles from an air flow flowing inside a conduit is provided. The method comprises directing at least a part of the particles towards a wall of the conduit by a protrusion extending inwardly from an inner surface of the wall, as the air flow flows along the conduit; and passing the particles moving towards the wall to an outer side of the conduit via at least one hole throughout a thickness of the wall, wherein the hole is positioned downstream of and adjacent to the protrusion.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relate to a separator for treating an air flow comprising particles, which can separate at least a part of the particles from the air flow, to obtain a particle-reduced air flow.

Figure 1:
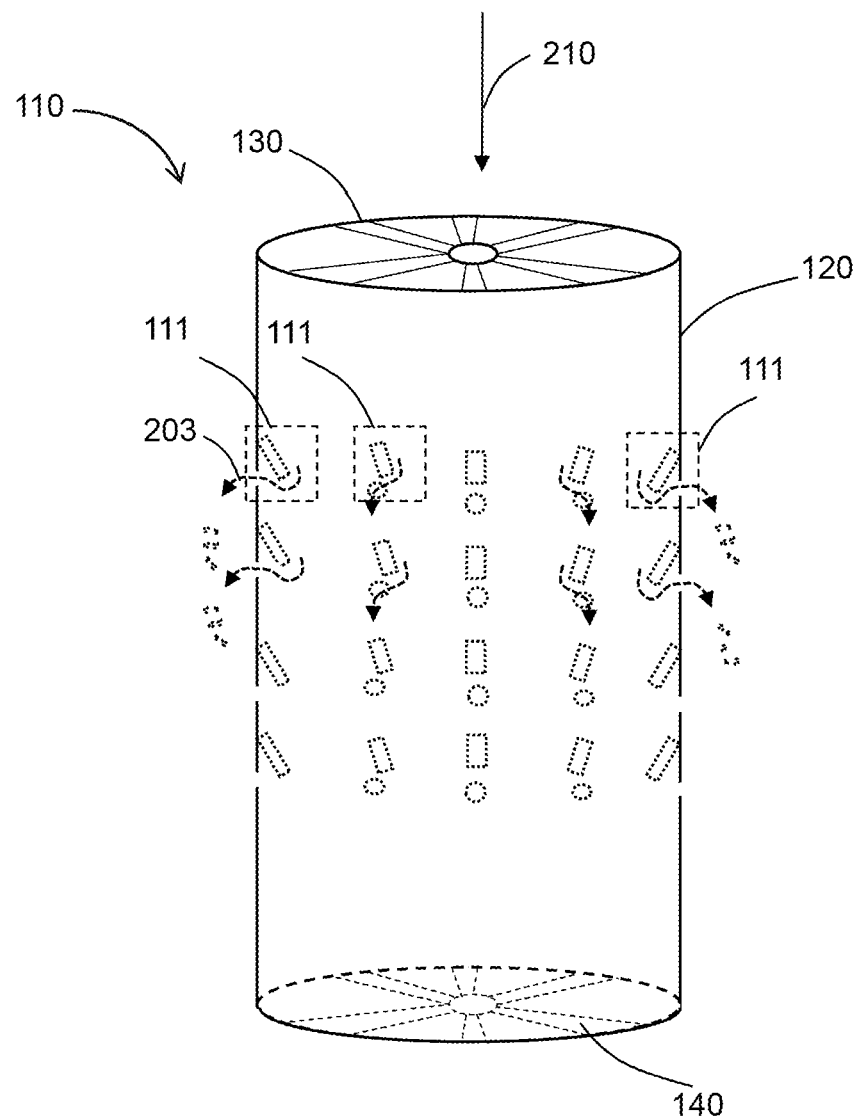
FIG. 1 is a sketch view of a separator for separating at least a part of particles from an air flow in accordance with an exemplary embodiment of the present disclosure.

FIG. 1 shows a sketch view of a separator 110 for separating at least a part of particles from an air flow 210 in accordance with an exemplary embodiment of the present disclosure. Referring to FIG. 1, the separator 110 is provided inside a conduit 120, and the air flow flows along an inner surface of the conduit 120.

The separator 110 comprises at least one separating unit 111 arranged on the inner surface of the conduit 120 and each configured to separate a part of the particles from the air flow 210. In some embodiments, as shown in FIG. 1, the separator 110 comprises a plurality of separating units 111, which may be distributed evenly or unevenly on the inner surface of the conduit 120.

Figure 2:
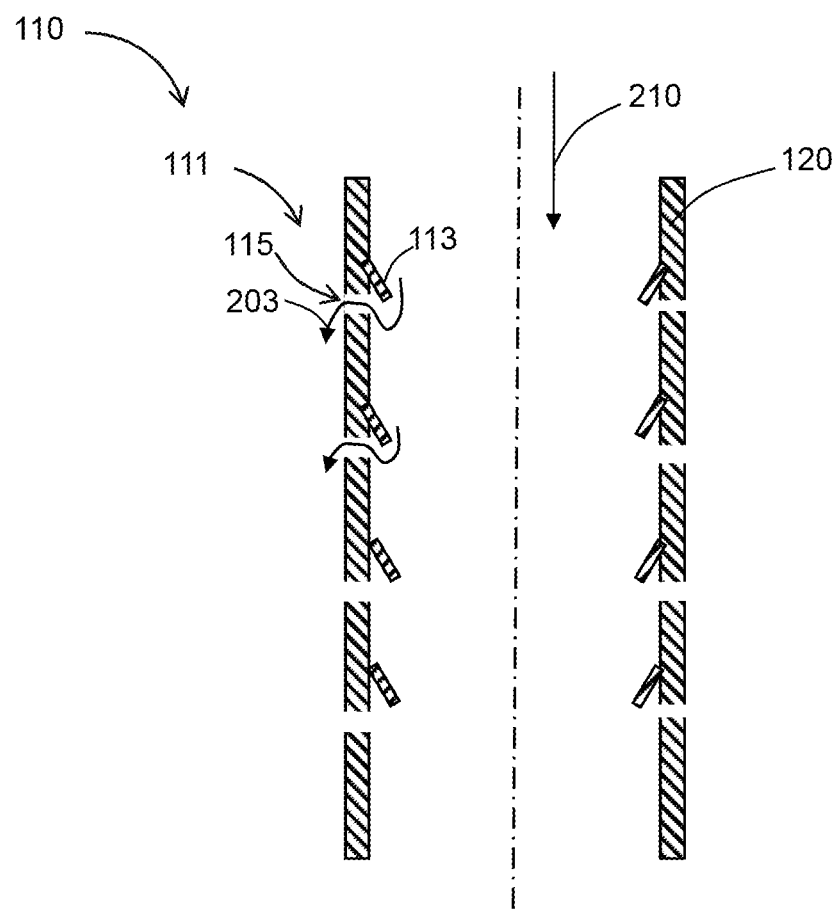
FIG. 2 is a sectional view of the separator shown in FIG. 1, wherein the separator comprises at least one separating unit.

FIG. 2 is a sectional view of the separator 110 in FIG. 1. Referring to FIG. 2, the separating unit 111 comprises a protrusion 113 extending inwardly from the inner surface of the conduit 120, and a hole 115 throughout a thickness of a wall of the conduit 120, wherein the hole 115 is positioned downstream of and adjacent to the protrusion 113. The protrusion 113 is configured to direct at least a part of the particles 203 in the air flow 210 to an outer side of the conduit 120 through the hole 115. The hole 115 is configured to pass the particles moving towards it to the outer side of the conduit 120. The protrusion 113 and the hole 115 are configured to make at least a part of the particles 203 in the air flow 210 tend to flow through the hole 115 to the outer side of the conduit 120, relative to air in the air flow. Specifically, a shape of the protrusion 113 and a relative position between the protrusion 113 and the hole 115 may be designed to make the particles 203 tend to flow towards the hole 115 relative to air.

Figure 3:
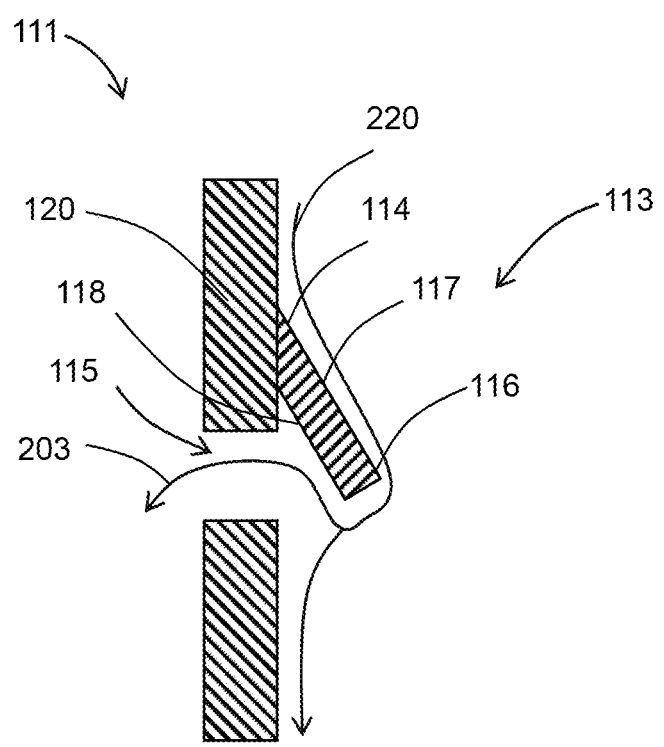
FIG. 3 is an enlarged view of the separating unit shown in FIG. 2.
Figure 4:
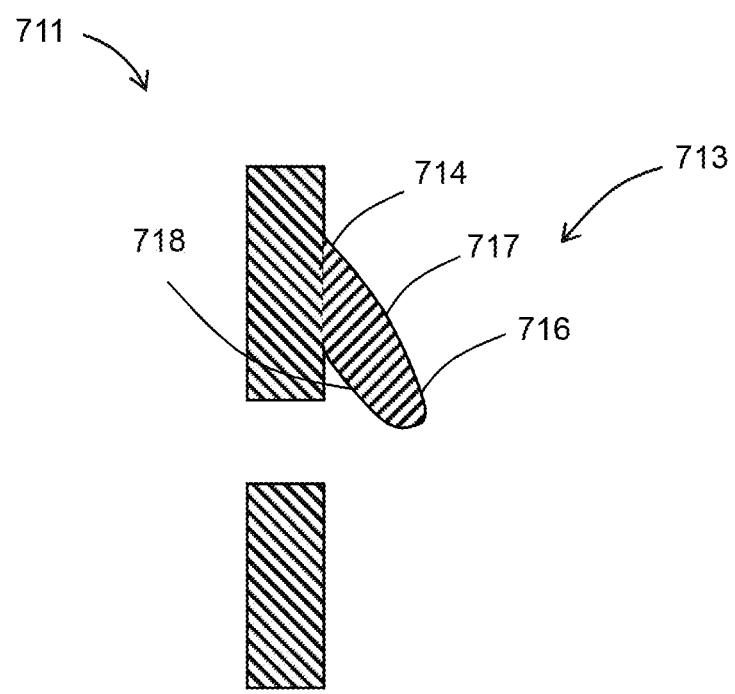
FIG. 4 is a sketch view of a separating unit in accordance with another exemplary embodiment of the present disclosure.
Figure 5:
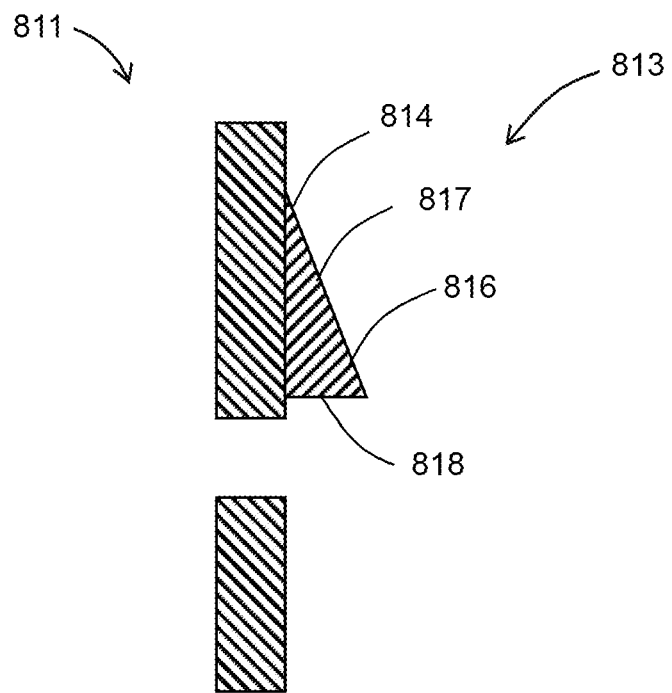
FIG. 5 is a sketch view of a separating unit in accordance with another exemplary embodiment of the present disclosure.

FIG. 3 is an enlarged view of the separating unit 111 shown in FIG. 1 and FIG. 2. Referring to FIG. 3, the protrusion 113 comprises a root portion 114 adjacent to the inner surface of the conduit 120 and a tip portion 116 away from the inner surface. The protrusion 113 further comprises an upper surface 117 and a lower surface 118.

The upper surface 117 facing the air flow is inclined downstream to form an angle with a longitudinal direction of the conduit 120, in such a manner that the upper surface 117 of the protrusion 113 can block at least a part of the air flow and thus change the flow direction thereof. The upper surface 117 may be a flat surface or a curved surface.

The lower surface 118 opposite to the upper surface 117 is configured to lead the part of particles 203 to flow along the lower surface 118 for at least a distance thereon. In some embodiments, the lower surface 118 is inclined downstream, and the part of particles 203 will flow reversely along the lower surface. In some other embodiments, the lower surface 118 may be perpendicular to the longitudinal direction of the conduit 120. The lower surface 118 may be a flat surface or a curved surface.

In some embodiments, the air flow 210 has a velocity where an inertial force of the air flow is smaller than a viscous force of the air flow, which satisfies a condition of Stokes flow. Stokes flow, also named creeping flow or creeping motion, is a type of fluid flow where advective inertial forces are small compared with viscous forces. The Reynolds number of Stokes flow is low. The low velocity of the air flow satisfying the Stokes flow condition can increase particle-flow interaction time to enhance particle migration towards the hole.

Referring to FIG. 3, a part 220 of the air flow flows along the inner surface of the conduit 120 until it encounters the root portion 114 of the protrusion 113. After the air flow encounters the root portion 114 of the protrusion 113, the air in the air flow tends to change its flow direction and keep moving forwards to an outlet of the conduit, whereas the particles in the air flow 203 tend to flow along on the surface of the protrusion 113 towards the corresponding hole downstream and adjacent to the protrusion 113. The protrusion 113 is configured to generate flow reversal locally, which directs particles into the corresponding hole.

In some embodiments, as shown in FIG. 3, both of the upper and lower surfaces are flat surfaces. In some embodiments, the protrusion 113 comprises a plate which forms an angle with the longitudinal direction of the conduit 120. The angle between the plate 113 and the longitudinal direction of the conduit 120 can be in a range from about 20 degrees to about 60 degrees.

FIG. 4 is a sketch view of a separating unit 711 in accordance with another exemplary embodiment of the present disclosure. Referring to FIG. 4, the separating unit 711 comprises a protrusion 713. The protrusion 713 comprises a root portion 714, a tip portion 716, an upper surface 717 and a lower surface 718, positions and functions of which are similar to the root portion 114, the tip portion 116, the upper surface 117 and the lower surface 118 shown in FIG. 3. A difference from these shown in FIG. 3 is that the upper surface 717 and the lower surface 718 are curved surfaces.

FIG. 5 is a sketch view of a separating unit 811 in accordance with another exemplary embodiment of the present disclosure. Referring to FIG. 5, the separating unit 811 comprises a protrusion 813. The protrusion 813 comprises a root portion 814, a tip portion 816, an upper surface 817 and a lower surface 818, positions and functions of which are similar to the root portion 114, the tip portion 116, the upper surface 117 and the lower surface 118 shown in FIG. 3. A difference from these shown in FIG. 3 is that the lower surface 818 is perpendicular to the longitudinal direction of the conduit.

Referring again to FIG. 1, in some embodiments, the separator 110 comprises a first inducer 130 positioned upstream of the at least one separating unit 111 and configured to swirl the air flow 210, in such a manner that the air flow 210 is centrifuged before being separated by the separating unit 111. As such, a separating effect of the separating unit 111 can be improved. In some embodiments, the separator 110 further comprises a second inducer 140 positioned downstream of the at least one separating unit 111 and configured to de-swirl a remainder of the air flow.

Embodiments of the present disclosure also relate to a device for removing at least a part of particles from an air flow in a turbine engine. This device can be widely used in the turbine engine to filter the air flow, and obtain a particle-reduced air flow.

Figure 6:
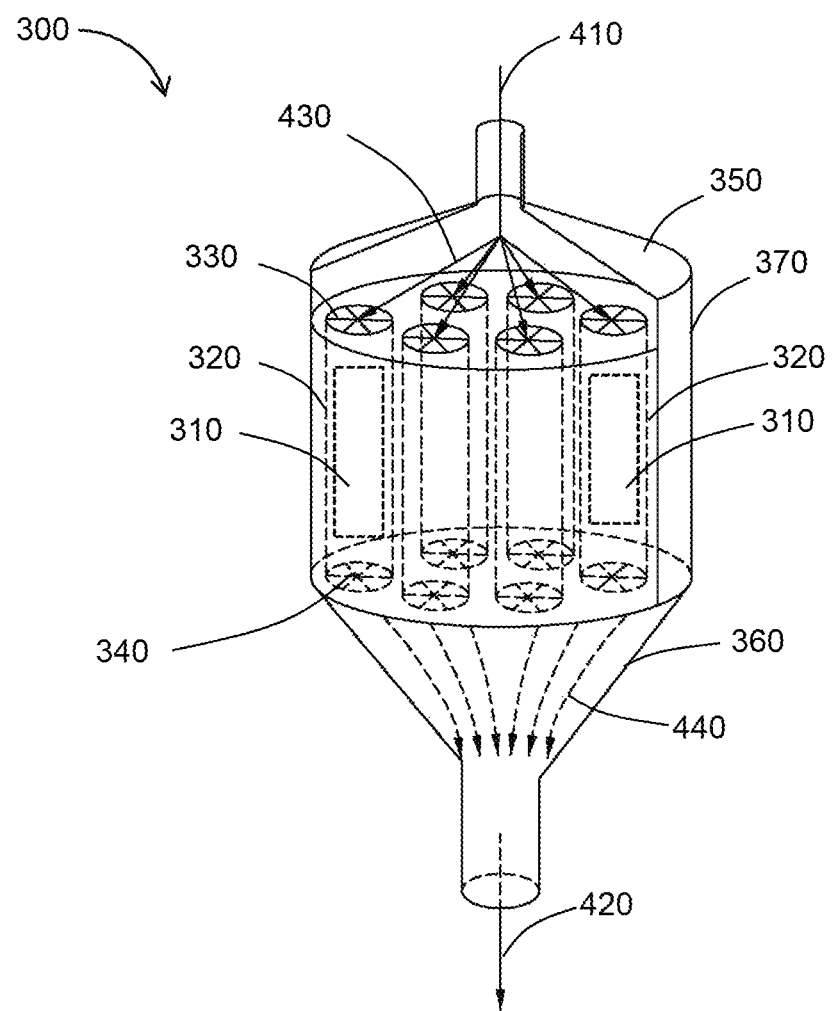
FIG. 6 is a sketch view of a device for removing at least a part of particles from an air flow in a turbine engine in accordance with an exemplary embodiment of the present disclosure, wherein the device comprises at least one separator.

FIG. 6 is a sketch view of a device 300 for removing at least a part of particles from an air flow 410 in a turbine engine. Referring to FIG. 6, the device 300 comprises a decelerator 350, at least one tube 320 and at least one separator 310 inside the least one tube 320 respectively.

The air flow 410 in the turbine engine, for example, from a high-pressure compressor, usually has a high flow velocity. The decelerator 350 is configured to decelerate the air flow 410 before it is separated. The reduced velocity of the air flow benefits lower pressure loss. In some embodiments, the air flow is decelerated by the decelerator 350 to a flow velocity where an inertial force of the air flow is smaller than a viscous force of the air flow, which satisfy a condition of Stokes flow.

In some embodiments, the decelerator 350 comprises an expander configured to decelerate the air flow 410 by expanding the air flow 410. Specifically, as shown in FIG. 6, the expander 350 comprises a tubular body, which is flared along a direction from upstream to downstream. The air flow is passed through the flared tubular body to be slowed down. In some embodiments, a diameter of the tubular body increases along the direction from upstream to downstream.

In some embodiments, as shown FIG. 6, the device 300 comprises a plurality of tubes 320 and a plurality of separators 310 inside the plurality of tubes 320 respectively. The plurality of tubes 320 are configured to split the decelerated air flow into a plurality of sub-flows 430, and then each sub-flow 430 is passed inside the corresponding tube 320. Each separator 310 inside the corresponding tube 320 is configured to separate at least a part of particles from the corresponding sub-flow 430 to obtain a particle-reduced sub-flow 440.

The device 300 further comprises a sleeve 370 enclosing the tubes 320. The sleeve 370 comprises a tubular body extending from the tubular body of the expander 350.

In some embodiments, the device 300 further comprises a combiner 360 for combining the particle-reduced sub-flows 440 and output the particle-reduced air flow 420. As shown in FIG. 3, the combiner 360 comprises a tubular body which is tapered along the direction from upstream to downstream. In some embodiments, the combiner 360 extends from the tubular body of the sleeve 370.

Figure 7:
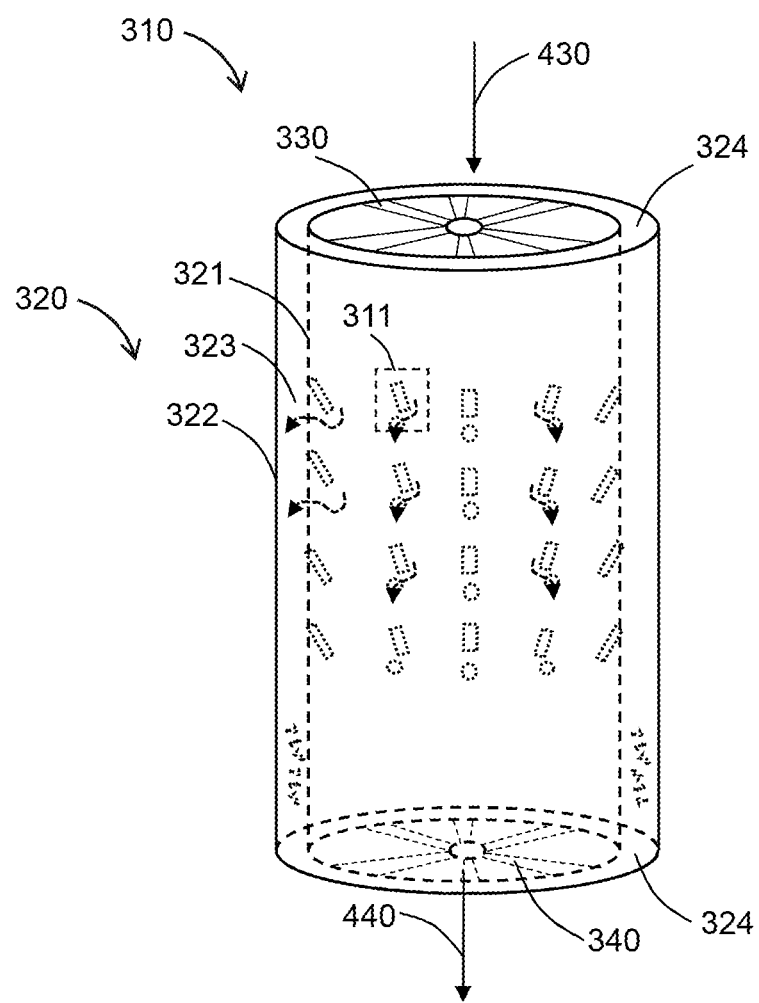
FIG. 7 is a sketch view of the separator shown in FIG. 6 in accordance with an exemplary embodiment of the present disclosure.

Referring to FIG. 7, each tube 320 comprises an inner peripheral wall 321 and a casing 322 outside the inner peripheral wall 321. The inner peripheral wall 321 is fluidly coupled with the decelerator for passing the decelerated air flow or the sub-flow 430 inside the inner peripheral wall. The casing 322 encloses the inner peripheral wall 321 to form a chamber 323 between the inner peripheral wall 321 and the casing 322. The chamber 323 is configured to accommodate the particles removed from the air flow 430.

In some embodiments, the casing 322 comprises an outer peripheral wall surrounding the inner peripheral wall 321, and two end covers 324 provided at two longitudinal ends of the outer peripheral wall respectively, each configured to cover a gap between the inner peripheral wall 321 and the outer peripheral wall 322 at each longitudinal end.

In some embodiments, the tube comprises a cavity wall with a chamber inside the cavity wall. The particles removed from the air flow is trapped inside the cavity wall, so that the removed particles will not flow out of the tube with the filtered air flow.

Each separator 310 comprises a plurality of separating units 311, arranged on the inner peripheral wall 321. Functions and structures of the separating unit 311 are similar to the separating unit 111 shown in FIG. 1 to FIG. 3, which will not be repeated here.

The device 300 comprises at least one inlet inducer 330 provided at an inlet of the at least one tube respectively, each inlet inducer 330 configured to swirl the decelerated air flow or the sub-flow 430 which flows into in the corresponding tube.

The device 300 further comprises at least one outlet inducer 340 provided at an outlet of the at least one tube respectively, each outlet inducer 340 configured to de-swirl the particle-reduced air flow or the particle-reduced sub-flow 440 which flows out of the corresponding tube.

Embodiments of the present disclosure also relate to a method for separating at least a part of particles from an air flow, wherein the air flow flows inside a conduit. The method comprises directing at least a part of the particle towards a wall of the conduit by a protrusion extending inwardly from an inner surface of the conduit, as the air flow flows along the conduit; and passing the particles moving towards the wall to an outer side of the conduit via at least one hole throughout a thickness of the wall, wherein the hole is positioned downstream of and adjacent to the protrusion.

Figure 8:
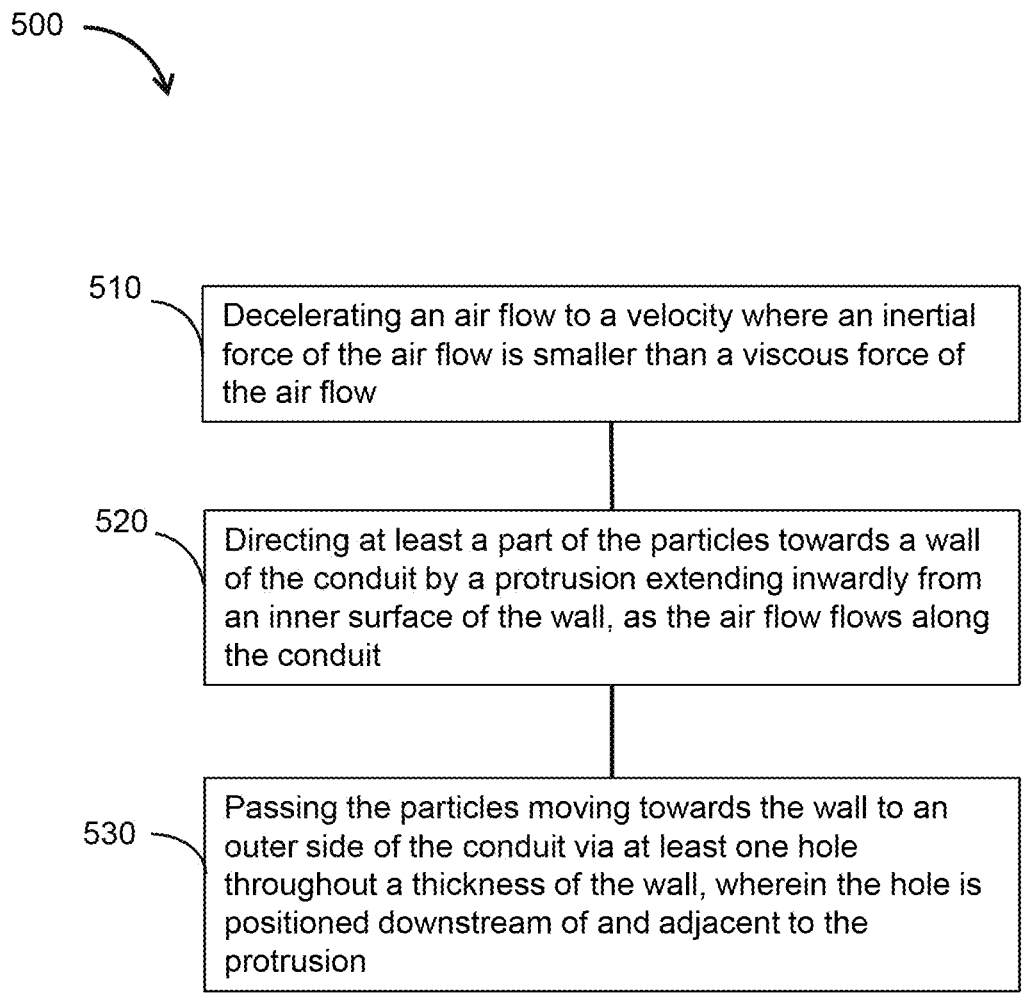
FIG. 8 is a flowchart illustrating a method for separating at least a part of particles from an air flow in accordance with an exemplary embodiment of the present disclosure.

FIG. 8 is a flowchart illustrating a method 500 for separating at least a part of particles from an air flow in accordance with an exemplary embodiment of the present disclosure. Referring to FIG. 8, the method comprises steps 510 to 530.

In step 510, the air flow is decelerated to a velocity where an inertial force of the air flow is smaller than a viscous force of the air flow. In some embodiments, the method comprises expanding the air flow in order to decelerate the air flow.

In step 520, at least a part of the particles are directed towards the wall of the conduit by a protrusion extending inwardly from an inner surface of the wall, as the air flow flows along the conduit.

In step 530, the particles moving towards the wall are passed to an outer side of the conduit via at least one hole throughout a thickness of the wall, wherein the hole is positioned downstream of and adjacent to the protrusion.

Embodiments of the present disclosure also relate to a method for removing at least of a part of particles from an air flow in a turbine engine.

Figure 9:
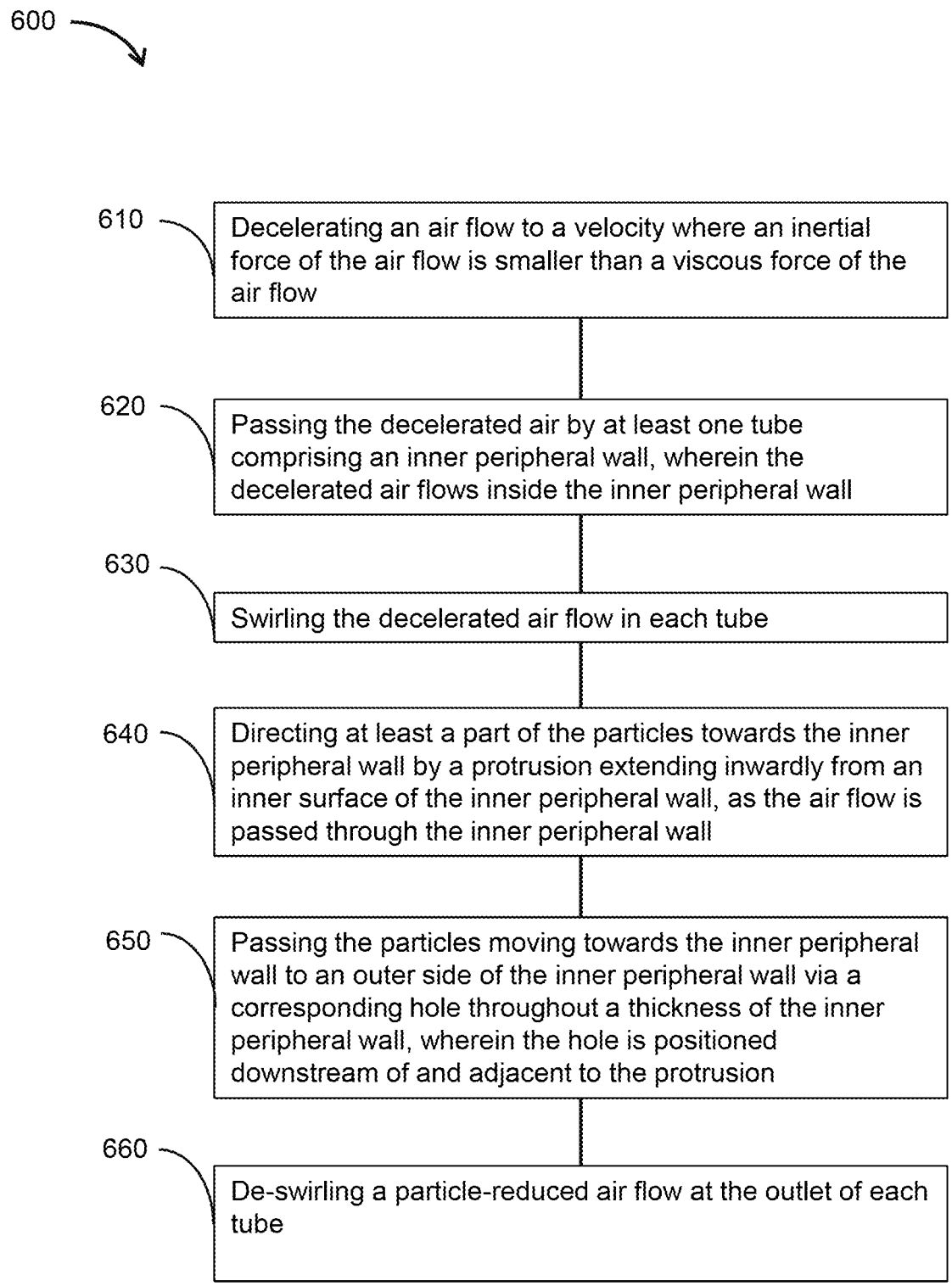
FIG. 9 is a flowchart illustrating a method for removing at least of a part of particles from an air flow in a turbine engine in accordance with an exemplary embodiment of the present disclosure.

FIG. 9 is a flowchart illustrating a method 600 for removing at least of a part of particles from an air flow in a turbine engine. Referring to FIG. 9, the method 600 comprises steps 610 to 660.

In step 610, the air flow is decelerated to a velocity where an inertial force of the air flow is smaller than a viscous force of the air flow.

In step 620, the decelerated air is passed by at least one tube comprising an inner peripheral wall, wherein the decelerated air flows inside of the inner peripheral wall. In some embodiments, step 620 further comprises splitting the decelerated air by a plurality of tubes.

In step 630, the decelerated air flow in each tube is swirled to be centrifuged, in such a manner that the particles in the decelerated air flow will tend to move outwardly in a radial direction. That is to say, at least a part of the particles in the decelerated air flow will get closer to the inner peripheral wall than the air in the decelerated air flow.

Subsequently, at least a part of particles are separated from the air flow in each tube, to obtain a particle-reduced air flow at an outlet of each tube. Specifically, the separating comprises steps 640 to 650.

In step 640, at least a part of the particles are directed towards the inner peripheral wall by a protrusion extending inwardly from an inner surface of the inner peripheral wall, as the air flow is passed through the inner peripheral wall.

In step 650, the particles moving towards the inner peripheral wall are passed to an outer side of the inner peripheral wall via a corresponding hole throughout a thickness of the inner peripheral wall, wherein the hole is positioned downstream of and adjacent to the protrusion.

Then, steps 640 to 650 can be repeated a plurality of times to separate the air flow a plurality of times.

After the separating, as shown in step 660, the particle-reduced air flow or sub-flow at the outlet of each tube is de-swirled to be outputted to downstream.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

What is claimed is:

1. A separator for separating at least a part of particles from an air flow, the separator comprising:
    a conduit extending between an inlet and an outlet to define a longitudinal direction where an air flow enters via the inlet and at least a portion of the air flow exits via the outlet, the separator comprising at least one separating unit, each separating unit comprising:
        a protrusion, extending inwardly from an inner surface of the conduit, having an upper surface facing the air flow and inclined downstream to form an angle with the longitudinal direction, and configured to direct at least a part of the particles from the air flow towards a wall of the conduit; and
        a hole throughout a thickness of the wall, positioned downstream of and adjacent to the protrusion, and configured to pass the particles moving towards the wall to an outer side of the conduit.

2. The separator according to claim 1, wherein the protrusion and the hole are configured to make the particles in the air flow tend to flow through the hole to the outer side of the conduit, relative to air of the air flow.

3. The separator according to claim 1, wherein the air flow has a velocity where an inertial force of the air flow is smaller than a viscous force of the air flow.

4. The separator according to claim 1, wherein the protrusion comprises a plate.

5. The separator according to claim 1, further comprising a first inducer positioned upstream of the at least one separating unit and configured to swirl the air flow.

6. The separator according to claim 5, further comprising a second inducer positioned downstream of the at least one separating unit and configured to de-swirl a remainder of the air flow.

7. A device for removing at least a part of particles from an air flow in a turbine engine, comprising:
    a decelerator, configured to decelerate the air flow to a velocity where an inertial force of the air flow is smaller than a viscous force of the air flow;
    at least one tube extending between an inlet and an outlet to define a longitudinal direction where an air flow enters via the inlet and at least a portion of the air flow exits via the outlet, each comprising an inner peripheral wall fluidly coupled with the decelerator for passing the decelerated air flow inside the inner peripheral wall; and
    at least one separator inside the at least one tube respectively, each configured to separate at least a part of particles from the decelerated air flow inside the corresponding at least one tube, wherein the separator comprises at least one separating unit, each comprising:
        a protrusion, extending inwardly from an inner surface of the inner peripheral wall, having an upper surface facing the air flow and inclined downstream to form an angle with the longitudinal direction, and configured to direct at least a part of the particles from the air flow towards the inner peripheral wall, and
        a hole throughout a thickness of the inner peripheral wall, positioned downstream of and adjacent to the protrusion, and configured to pass the particles moving towards the inner peripheral wall to an outer side of the inner peripheral wall.

8. The device according to claim 7, wherein the at least one tube comprises a plurality of tubes for splitting the decelerated air flow into a plurality of sub-flows, and the at least one separator comprises a plurality of separators inside the plurality of tubes respectively, each configured to separate at least a part of particles from a corresponding sub-flow.

9. The device according to claim 7, wherein the tube further comprises a casing outside the inner peripheral wall to form a chamber between the inner peripheral wall and the casing, wherein the chamber is configured to receive the particles passed to the outer side of the inner peripheral wall.

10. The device according to claim 9, wherein the casing comprises an outer peripheral wall surrounding the inner peripheral wall, and two end covers provided at two longitudinal ends of the outer peripheral wall respectively, each cover configured to cover a gap between the inner peripheral wall and the outer peripheral wall at each longitudinal end.

11. The device according to claim 7, wherein the decelerator comprises an expander configured to expand the air flow.

12. The device according to claim 11, wherein the expander comprises a tubular body, which is flared along a direction from upstream to downstream.

13. The device according to claim 7, further comprising at least one inlet inducer provided at an inlet of the at least one tube respectively, each inlet inducer configured to swirl the decelerated air flow which flows into in the corresponding at least one tube.

14. The device according to claim 13, further comprising at least one outlet inducer provided at an outlet of the at least one tube respectively, each outlet inducer configured to de-swirl a particle-reduced air flow which flows out of the corresponding at least one tube.

* * * * *